US011579942B2

(12) United States Patent
Kurkure et al.

(10) Patent No.: US 11,579,942 B2
(45) Date of Patent: Feb. 14, 2023

(54) VGPU SCHEDULING POLICY-AWARE MIGRATION

(71) Applicant: VMware, Inc., Palo Alto, CA (US)

(72) Inventors: Uday Pundalik Kurkure, Los Altos Hills, CA (US); Hari Sivaraman, Livermore, CA (US); Lan Vu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 283 days.

(21) Appl. No.: 16/890,156

(22) Filed: Jun. 2, 2020

(65) Prior Publication Data

US 2021/0373972 A1 Dec. 2, 2021

(51) Int. Cl.
*G06F 9/46* (2006.01)
*G06F 9/50* (2006.01)
*G06F 9/455* (2018.01)
*G06T 1/20* (2006.01)
*G06F 9/48* (2006.01)

(52) U.S. Cl.
CPC ........ *G06F 9/5088* (2013.01); *G06F 9/45558* (2013.01); *G06F 9/4881* (2013.01); *G06F 9/5077* (2013.01); *G06T 1/20* (2013.01); *G06F 2009/4557* (2013.01); *G06F 2009/45579* (2013.01); *G06F 2009/45583* (2013.01)

(58) Field of Classification Search
CPC .................................................. G06F 9/45558
USPC ........................................................ 718/102
See application file for complete search history.

(56) References Cited

U.S. PATENT DOCUMENTS

| 5,530,860 | A | * | 6/1996 | Matsuura | G06F 9/5038 |
| | | | | | 718/105 |
| 8,669,990 | B2 | * | 3/2014 | Sprangle | G06F 9/3877 |
| | | | | | 712/205 |
| 8,713,574 | B2 | * | 4/2014 | Creamer | G06F 9/5061 |
| | | | | | 718/104 |
| 9,733,963 | B2 | * | 8/2017 | Hansson | G06T 1/20 |
| 10,255,652 | B2 | * | 4/2019 | Featonby | G06F 9/5077 |
| 2006/0294524 | A1 | * | 12/2006 | Vega | G06F 9/5027 |
| | | | | | 703/23 |
| 2011/0083131 | A1 | * | 4/2011 | Pirzada | G06F 9/5077 |
| | | | | | 718/1 |

(Continued)

OTHER PUBLICATIONS

Chen et al. : "GaaS Workload Characterization under NUMA Architecture for Virtualized GPU" 2017 IEEE International Symposium on Performance Analysis of Systems and Software. Apr. 2017, p. 65-76.*

*Primary Examiner* — Mehran Kamran
(74) *Attorney, Agent, or Firm* — Thomas Horstemeyer, LLP

(57) ABSTRACT

Disclosed are aspects of virtual graphics processing unit (vGPU) scheduling-aware virtual machine migration. Graphics processing units (GPUs) that are compatible with a current virtual GPU (vGPU) profile for a virtual machine are identified. A scheduling policy matching order for a migration of the virtual machine is determined based on a current vGPU scheduling policy for the virtual machine. A destination GPU is selected based on a vGPU scheduling policy of the destination GPU being identified as a best available vGPU scheduling policy according to the scheduling policy matching order. The virtual machine is migrated to the destination GPU.

20 Claims, 5 Drawing Sheets

(56) References Cited

U.S. PATENT DOCUMENTS

| | | | |
|---|---|---|---|
| 2011/0084973 A1* | 4/2011 | Masood | G06F 9/455 345/506 |
| 2013/0021353 A1* | 1/2013 | Drebin | G06T 1/60 345/522 |
| 2013/0290956 A1* | 10/2013 | Kruglick | H04L 43/0852 718/1 |
| 2014/0176583 A1* | 6/2014 | Abiezzi | G06T 1/20 345/522 |
| 2014/0181806 A1* | 6/2014 | Abiezzi | G06F 9/45558 718/1 |
| 2014/0181807 A1* | 6/2014 | Fonseca | G06F 9/5083 718/1 |
| 2016/0057074 A1* | 2/2016 | Jacobs | H04L 47/74 709/226 |
| 2016/0299773 A1* | 10/2016 | Dong | G06F 9/45558 |
| 2018/0060996 A1* | 3/2018 | Tunuguntla | G06F 9/45558 |
| 2018/0130171 A1* | 5/2018 | Prakash | G06T 1/20 |
| 2018/0204301 A1* | 7/2018 | Featonby | G06T 1/20 |
| 2018/0293701 A1* | 10/2018 | Appu | G06F 9/5044 |
| 2018/0349204 A1* | 12/2018 | Liu | G06F 9/4881 |
| 2019/0019267 A1* | 1/2019 | Suresh | G06F 9/5066 |
| 2019/0087213 A1* | 3/2019 | Matters | G06F 9/45558 |
| 2019/0102212 A1* | 4/2019 | Bhandari | G06F 9/3877 |
| 2019/0139185 A1* | 5/2019 | Baggerman | G06T 1/20 |
| 2019/0286479 A1* | 9/2019 | Tian | G06F 9/4881 |
| 2019/0347137 A1* | 11/2019 | Sivaraman | G06F 9/45533 |
| 2019/0361750 A1* | 11/2019 | Sequeira | G06F 9/4862 |
| 2020/0058094 A1* | 2/2020 | Prakash | G06F 9/50 |
| 2020/0082495 A1* | 3/2020 | Featonby | G06T 1/20 |
| 2020/0249987 A1* | 8/2020 | Jiang | G06F 9/461 |
| 2020/0394063 A1* | 12/2020 | Kelly | G06F 9/452 |
| 2020/0394748 A1* | 12/2020 | Wilt | G06F 9/5077 |
| 2021/0011751 A1* | 1/2021 | Garg | G06F 17/11 |
| 2021/0011773 A1* | 1/2021 | Garg | G06F 9/45558 |
| 2021/0026672 A1* | 1/2021 | Kurkure | G06F 9/5083 |
| 2021/0110506 A1* | 4/2021 | Prakash | G06T 1/20 |
| 2021/0194674 A1* | 6/2021 | Chen | G06K 9/6215 |
| 2021/0216375 A1* | 7/2021 | Sivaraman | G06F 9/546 |
| 2021/0303327 A1* | 9/2021 | Vu | G06F 9/45558 |

* cited by examiner

VGPU SCHEDULING POLICY-AWARE MIGRATION

BACKGROUND

A cluster can include a collection of hosts in which a processor, memory, storage, and other hardware resources are aggregated for utilization. A host is capable of running one or more virtual computing instances, such as virtual machines. A virtual machine can include an operating system (OS) running one or more applications. Virtual machines running on a host can utilize host resources. However, if a virtual machine is placed on a host with insufficient resources available to meet the resource demands of the virtual machines, the host becomes overloaded.

In some existing solutions, one or more virtual machines on an overloaded host can be relocated to a different host in the cluster, in an attempt to remediate the overloaded host. A scheduling service is utilized in some systems to select a host for placement of virtual machines and balance the resource utilization among the hosts in the cluster. However, these placement decisions are frequently made based on insufficient information regarding resource demands of the virtual machines and resource availability of the hosts. This can result in sub-optimal placement of virtual machines, unbalanced hosts, network saturation, overloading of network links, and/or overall inefficient utilization of available resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to virtual graphics processing unit (vGPU) scheduling policy-aware migration for virtual machines. Virtual GPU (vGPU) enabled systems can include data centers, cloud computing services, and other computing environments. The hosts of the computing environment can include vGPU-enabled graphics processing units (GPUs). The data centers can balance resources by migrating virtual machines between hosts. However, vGPU-enabled GPUs can utilize different vGPU scheduling types or policies that control how time slices are divided among vGPUs. Existing systems do not consider the vGPU scheduling policies when migrating a virtual machine. As a result, performance can unexpectedly vary and degrade. However, as disclosed herein, a solution can be provided to maintain and normalize performance of vGPU enabled systems by considering vGPU scheduling policies during the migration process.

Figure 1:
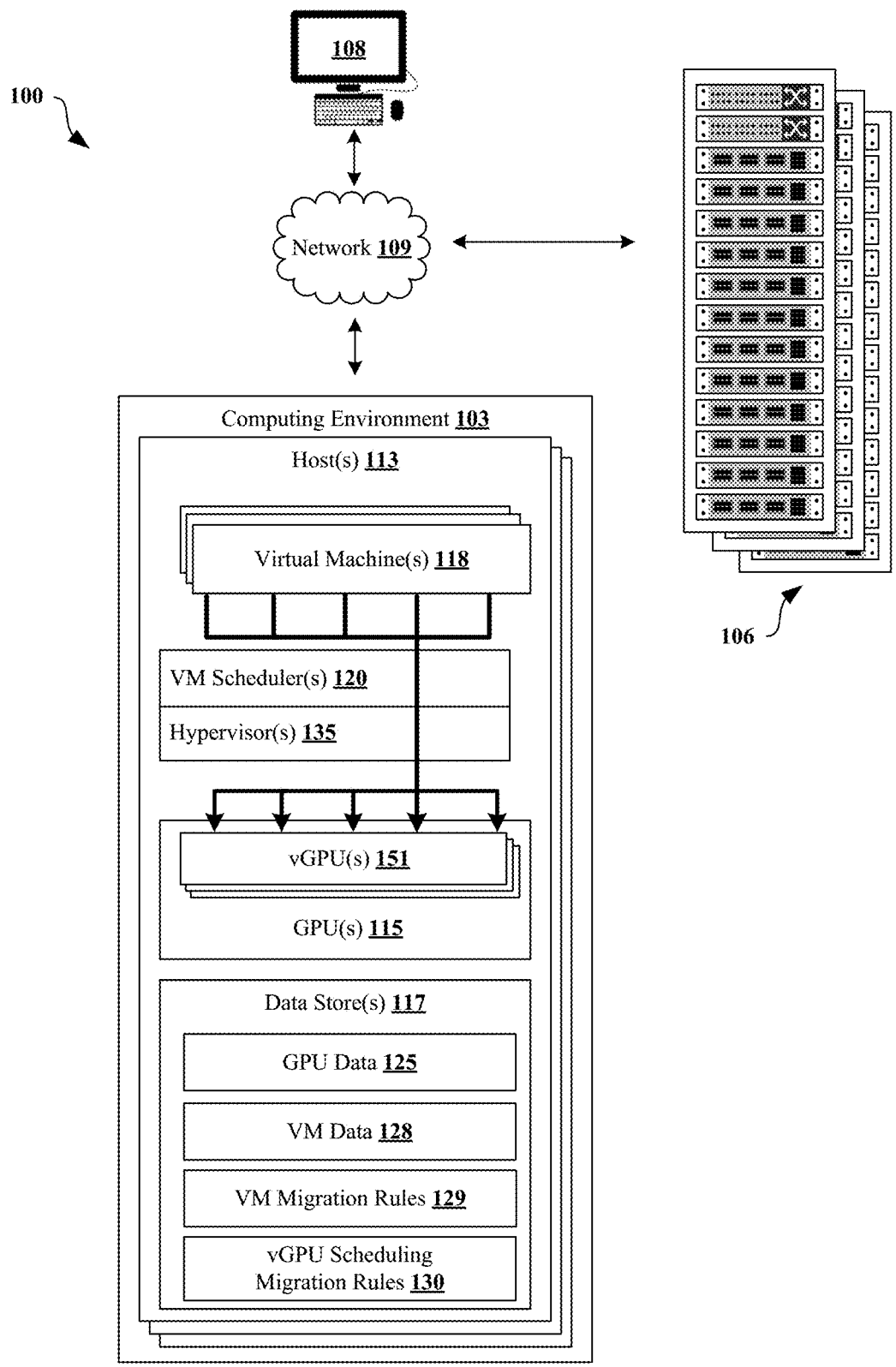
FIG. 1 is a block diagram illustrating an example of a networked environment that includes a computing environment, a client device, and other components in communication over a network.

With reference to FIG. 1, an example of a networked environment 100 is shown. The networked environment 100 can include a computing environment 103, various clusters 106, and one or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

The computing environment 103 can include hosts 113. The hosts 113 can include processors, GPUs 115, data stores 117, and other hardware resources installed in physical machines of the computing environment 103. In some examples, the computing environment 103 can include an enterprise computing environment that includes hundreds, or even thousands of physical machines, virtual machines, and other software implemented in devices stored in racks, distributed geographically and connected to one another through the network 109. It is understood that any virtual machine or virtual appliance is implemented using at least one physical device.

The computing environment 103 can include, for example, a server or any other system providing computing capability and other hosts 113. Alternatively, the computing environment 103 can include one or more computing devices that are arranged, for example, in one or more server banks, computer banks, clusters, or other arrangements. The computing environment 103 can include a grid computing resource or any other distributed computing arrangement. The computing devices can be located in a single installation or can be distributed among many different geographical locations. Although shown separately from the clusters 106, in some examples, the clusters 106 can be a portion of the computing environment 103. Various applications can be executed on the computing environment 103. For example, a virtual machine scheduler 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the clusters 106 and client devices 108 for end users over the network 109, sometimes remotely, the computing environment 103 can be described as a remote computing environment 103 in some examples. Additionally, in some examples, the computing environment 103 can be implemented in hosts of a rack of the computer clusters 106 and can manage operations of a virtualized computing environment.

The GPUs 115 can be vGPU-enabled, or support vGPUs 151. For example, NVIDIA® vGPU solutions can allow multiple virtual machines 118, or workloads, to share a GPU 115 with a balance among performance, security and isolation. Each virtual machine 118 can be assigned to a vGPU 151 of the GPU 115. In vGPU mode or mediated pass-through mode, virtual machines 118 time-share the GPU 115 resources by time-slicing and hardware preemption based on vGPU-enabled architectures such as the NVIDIA® Pascal architecture. Through the vGPU-enabled architecture, in any given time slice, only one virtual machine 118 runs on a GPU 115. All GPU cores of the GPU 115 are given to this virtual machine 118 during the time slice, even if it does not use all of the cores.

The GPU internal memory can be statically partitioned based on a vGPU profile. For example, NVIDIA® Tesla P100 16 GB GPU 115 can support 1 GB, 2 GB, 4 GB, 8 GB, and 16 GB vGPU profiles. The profiles can equally divide the total GPU memory of the GPU 115 into sections or partitions according to the memory size of the vGPU profile. When configured with a 1 GB profile, an NVIDIA® Tesla P100 can support up to 16 virtual machines 118, each provided with 1 GB of the total 16 GBs of the NVIDIA® Tesla P100 GPU 115. The NVIDIA® Tesla P100 GPU 115 can support up to 8 virtual machines 118 using the 2 GB profile, 4 virtual machines 118 using the 4 GB profile, 2 virtual machines 118 using the 8 GB profile, and a single virtual machine 118 using the 16 GB profile.

An NVIDIA® Tesla P40 24 GB GPU 115 can support 1 GB, 2 GB, 3 GB, 4 GB, 6 GB, 8 GB, 12 GB, and 24 GB vGPU profiles. When configured with a 1 GB profile, an NVIDIA® Tesla P40 can support up to 24 virtual machines 118, each provided with 1 GB of the total 24 GBs of the NVIDIA® Tesla P40 GPU 115. The NVIDIA® Tesla P40 GPU 115 can support up to 12 virtual machines 118 using the 2 GB profile, 8 virtual machines 118 using the 3 GB profile, 6 virtual machines 118 using the 4 GB profile, 4 virtual machines 118 using the 6 GB profile, 2 virtual machines 118 using the 12 GB profile, and a single virtual machine 118 using the 24 GB profile.

A vGPU-enabled GPU 115 can be associated with a vGPU scheduler that resides in the hypervisor 135. The vGPU scheduler can implement various vGPU scheduling policies or vGPU scheduling policies that control how time slices are allocated to the vGPUs 151 of the GPU 115. The scheduling policies can include best effort, equal share, and fixed share. In the best effort policy, each virtual machine 118 or workload assigned to vGPUs 151 of a GPUs 115 can use GPU cycles until its time slice is over or until the job queue is empty. The vGPU scheduler can distribute GPU cycles among all virtual machines 118 that are running CUDA applications using vGPUs. Under some circumstances, a virtual machine 118 running a graphics-intensive application can adversely affect the performance of graphics-light applications running in other virtual machines 118.

For equal share, the amount of cycles given to each vGPU 151 is determined by the current number of virtual machines 118 of vGPUs, regardless of whether these virtual machines 118 are running CUDA or GPU-utilizing applications or not. As a result, the performance of a vGPU 151 may increase as other vGPUs 151 on the same GPU 115 are stopped or may decrease as other vGPUs 151 are started on the same GPU 115.

For fixed share, the amount of cycles given to each vGPU 151 is determined by the total number of supported virtual machines 118 under the given scheduling policy, regardless if other virtual machines 118 are powered on or not. The vGPU scheduler can be responsible for scheduling vGPUs 151 of that GPU 115. As vGPUs 151 are added to or removed from a GPU 115, the share of processing cycles allocated to each vGPU 151 remains constant. As a result, the performance of a vGPU 151 remains unchanged as other vGPUs 151 are stopped or started on the same GPU 115.

The data store 117 can include memory of the computing environment 103, mass storage resources of the computing environment 103, or any other storage resources on which data can be stored by the computing environment 103. In some examples, the data store 117 can include one or more relational databases, object-oriented databases, hierarchical databases, hash tables or similar key-value data stores, as well as, other data storage applications or data structures. The data stored in the data store 117, for example, can be associated with the operation of the various services or functional entities described below. For example, virtual machines 118, the virtual machine scheduler 120, GPU data 125, virtual machine data 128, virtual machine migration rules 129, and vGPU scheduling migration rules 130 can be stored in the data store 117.

The virtual machine scheduler 120 can schedule or assign virtual machines 118 to execute in hosts 113 of the computing environment 103. The virtual machine scheduler 120 can also migrate virtual machines 118 from one host 113 to another. Migrations can be performed at the direction of an administrator to move a virtual machine 118 to a desired cluster 106, to a host 113 in a particular geographical location, or to another desired host 113. The virtual machine scheduler 120 can also automatically migrate virtual machines 118 for load balancing or resource optimization purposes. For example, the virtual machine scheduler 120 can migrate a virtual machine 118 to a host 113 with a lower resource utilization than its current or source host 113, in order to increase performance and reduce resource contention. In other situations, the virtual machine scheduler 120 can migrate a virtual machine 118 to a host 113 with a higher resource utilization in order to minimize a total number of hosts 113 used, which can decrease costs or energy usage. The virtual machine scheduler 120 can be responsible for virtual machine 118 placement and migration within the computing environment.

The virtual machine scheduler 120 can migrate the virtual machine 118 to a selected host 113 and GPU 115 of the networked environment 100, in consideration of the current vGPU scheduling policy of the virtual machine 118. In order to select the host 113 and GPU 115, the virtual machine scheduler 120 can maintain a table or another data structure that maps GPU profiles to GPU identifiers of GPUs 115.

TABLE 1

| vGPU profiles | Sorted List of GPU IDs |
|---|---|
| no-profile | (1, 3, 5) |
| P40-1q | (2, 6, 4) |
| P40-2q | (7, 9) |
| P40-3q | (8, 12, 13) |
| P40-4q | (14) |
| P40-6q | (15, 16, 20) |
| P40-8q | (17, 18, 19) |
| P40-12q | (21, 22,) |
| P40-24q | (23, 24) |

Table 1 can provide a list of GPUs 115 for each profile, including GPUs 115 with no-profile. A GPU 115 can have no profile if no virtual machines 118 are currently assigned to execute on the GPU 115. As a result, no vGPUs 151 need to be maintained or created, and the GPU 115 can be open to configuration to any vGPU profile that is supported by the GPU 115.

The virtual machine scheduler 120 can also maintain a data structure that maps each of the GPUs 115 to a number of virtual machines currently executing.

TABLE 2

| GPU IDs | # of VMs running | HOST_IDs |
|---|---|---|
| 1 | 0 | H1 |
| 2 | 11 | H3 |
| 3 | 0 | H4 |
| 4 | 12 | H24 |
| 5 | 0 | H7 |
| 6 | 11 | H9 |
| 7 | 6 | H20 |
| ... | ... | ... |
| 24 | 1 | H2 |

Table 2 shows that the GPU identifier for each GPU 115 can be mapped to the number of executing virtual machines, as well as to a host identifier for a host 113.

The virtual machine scheduler 120 can also determine or identify a maximum number of vGPUs 151 per GPU 115, based on its total memory and its vGPU profile. The virtual machine scheduler 120 can create and maintain a table that includes this information.

TABLE 3

| vGPU Profile | Maximum vGPUs per physical GPU |
|---|---|
| P40-1q | 24 |
| P40-2q | 12 |
| P40-3q | 8 |
| P40-4q | 6 |
| P40-6q | 4 |
| P40-8q | 3 |
| P40-12q | 2 |
| P40-24q | 1 |

Table 3 can be used to identify the maximum number of virtual machines 118 or vGPUs 151 supported for each vGPU profile for a particular type of GPU.

The virtual machine scheduler 120 can also maintain a data structure that maps each of the GPUs 115 to the vGPU scheduling policy that is configured for its scheduler, as shown in Table 4.

TABLE 4

| GPU IDs | Scheduler |
|---|---|
| 1 | Best Effort |
| 2 | Fixed Share |
| 3 | Equal Share |
| 4 | Equal Share |
| 5 | Fixed Share |
| 6 | Best Effort |
| 7 | Fixed Share |
| ... | ... |
| 24 | Best Effort |

The GPU data 125 can include the information discussed in Tables 1-4.

The virtual machine scheduler 120 can also maintain vGPU scheduling migration rules 130 that include a number of predetermined vGPU scheduling policy matching orders for a migration of a virtual machine 118.

TABLE 5

| Source vGPU Sched. Policy | vGPU Sched. Policy Matching Order |
|---|---|
| EQUAL SHARE | EQUAL SHARE→BEST EFFORT→FIXED |
| FIXED | FIXED → EQUAL SHARE→BEST EFFORT |
| BEST EFFORT | BEST EFFORT→EQUAL SHARE-FIXED |

Table 5 shows an example of how a source vGPU scheduling policy can be used to identify a vGPU scheduling policy matching order for migration. For equal share, the vGPU scheduling policy matching order can list equal share, best effort, and fixed share in order of decreasing priority. For fixed share, the vGPU scheduling policy matching order can list fixed share, equal share, and best effort in order of decreasing priority. For best effort, the vGPU scheduling policy matching order can list best effort, equal share, and fixed share in order of decreasing priority. Other orders can also be provided. Tables 1-5 are provided as nonlimiting examples for illustrative purposes, and can be maintained as any data structure, as can be understood.

The vGPU scheduling migration rules 130 can include a number of vGPU scheduling policy matching orders. Each of the vGPU scheduling policy matching orders can be specifically tailored for a particular vGPU scheduling policy. When a virtual machine 118 is migrated, the virtual machine scheduler 120 can identify its source vGPU scheduling policy. The source vGPU scheduling policy for the virtual machine 118 can be the vGPU scheduling policy configured to be used by the source GPU 115 assigned to execute graphics processing loads for the virtual machine 118. The source vGPU scheduling policy of the virtual machine 118 can be used as a key or parameter to identify a vGPU scheduling policy matching orders predetermined and specific to that vGPU scheduling policy.

The vGPU scheduling policy matching orders can indicate, for each scheduling policy that can be implemented in a GPU 115 of the computing environment 103, a prioritized list of scheduling policies. When a virtual machine 118 is migrated, its source vGPU scheduling policy, corresponding to the vGPU scheduling policy of the virtual machine's source GPU 115, can be used as an input to identify a prioritized list of scheduling policies for the migration. The virtual machine scheduler 120 can then determine a destination GPU 115 that has a best available scheduling policy among candidate GPUs 115 for the migration.

When a decision is made to migrate a virtual machine 118, the virtual machine scheduler 120 can call a method or set of instructions that identifies a destination GPU 115 for the virtual machine 118. The pseudocode in Table 6 provides an example for illustrative purposes.

TABLE 6

```
int identifyGPUforVMmigration (vm) // returns appropriate destination
GPU                                // for VMmigration
{
  src_gpu_d=get_gpuid(vm)
  vgpu_profile=get_vgpu_profile(vm);
  src_scheduling policy=GPU_TO_SCHEDULING_POLICY[src_gpu_id]
  gpu_list = PROFILE_TO_GPU_ID[vgpu_profile];
// find the destination gpu with the same scheduling policy
    foreach gpu in gpu_list {
      if (GPU_TO_SCHEDULING_POLICY [gpu] == src_scheduling_policy) {
        if GPU_TO_NUM_VMS[gpu] < PROFILE_TO_MAX_VMS[vgpu_profile] {
          return gpu
        }
      }
    }
// if gpu with matching scheduling policy not found
  switch (src_scheduling_policy)
  {
    Case "FIXED":
        Dst_scheduling_policy = "EQUAL_SHARE"
        Break;
    Case "EQUAL_SHARE":
        Dst_scheduling_policy = "BEST_EFFORT"
        Break;
    Case "BEST EFFORT":
        Dst_scheduling_policy = "EQUAL_SHARE"
        Break;
    Default:
  }
  foreach gpu in gpu_list {
      if (GPU_TO_SCHEDULING_POLICY [gpu] == Dst_scheduling_policy) {
        if GPU_TO_NUM_VMS[gpu] < PROFILE_TO_MAX_VMS[vgpu_profile] {
          return gpu
        }
      }
    }
  return –1
}
VMmigration(vm) {
  dst_gpu= identifyGPUforVMmigration(vm)
  call_vm_migration_api(vm, gpu, dest_gpu)
  GPU_TO_NUM_VMS[gpu]--
  GPU_TO_NUM_VMS[dest_gpu]++
}
```

Figure 5:
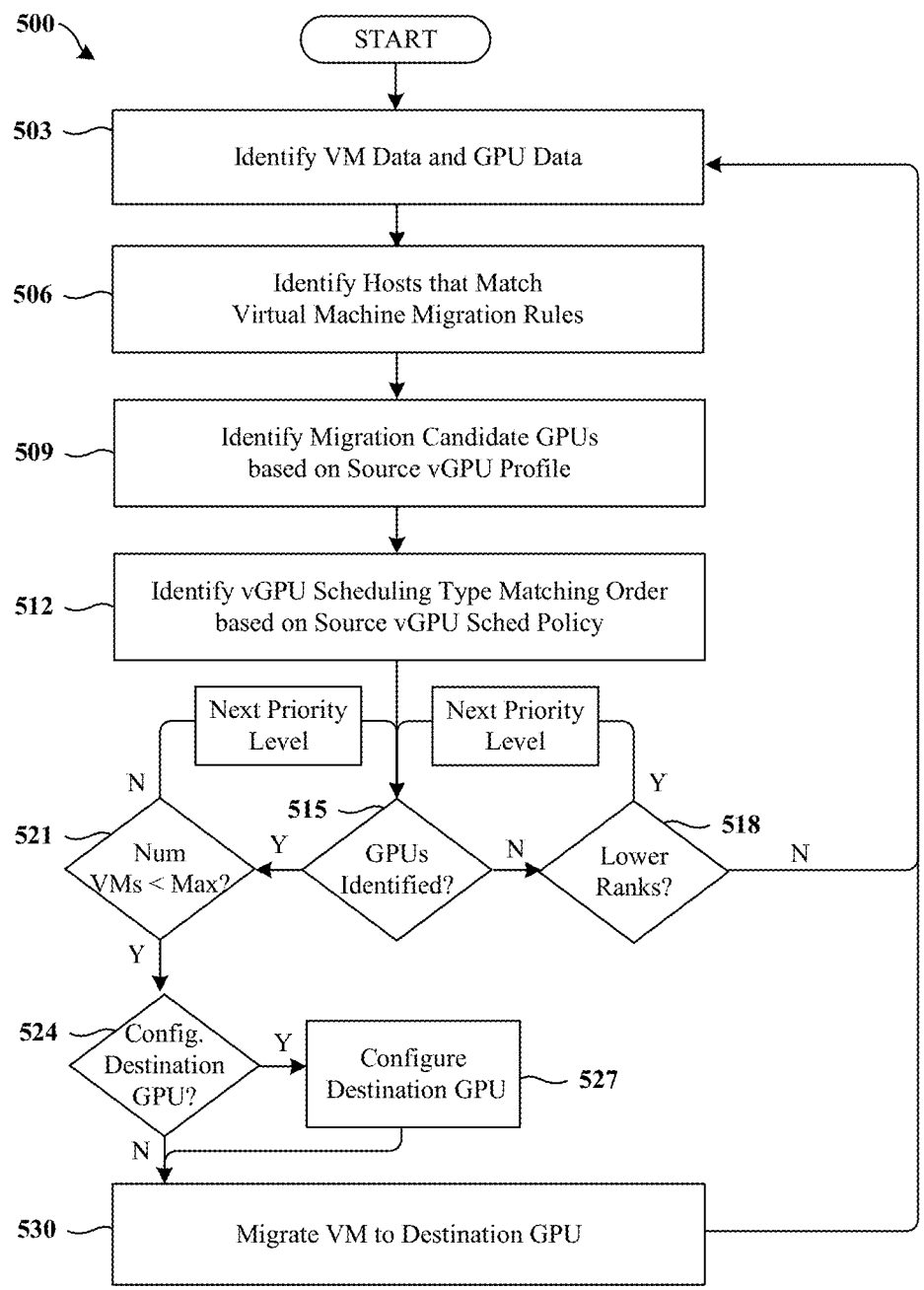
FIG. 5 is a flowchart that illustrates an example of functionalities performed using components of the networked environment.

As discussed further with respect to FIG. 5, the virtual machine scheduler 120 can identify a source vGPU profile and source vGPU scheduling policy currently being used for the virtual machine 118 by its GPU 115. The virtual machine scheduler 120 can obtain a list of candidate GPUs 115 with a vGPU profile that matches the source vGPU profile. Matching GPUs 115 include GPUs 115 with no current vGPUs 151 and no current vGPU profile, if the GPU 115 supports the source vGPU profile. The virtual machine scheduler 120 can configure such unconfigured or unutilized GPUs 115 during migration if selected as a destination.

The virtual machine scheduler 120 can iteratively examine the list of candidate GPUs 115 to identify a vGPU scheduling policy that has a best-available vGPU scheduling policy according to the vGPU scheduling policy matching order corresponding to the source vGPU scheduling policy. Generally, the vGPU scheduling policy matching order can list the source vGPU scheduling policy at its highest priority level, so vGPU scheduling will not affect performance. In that case, if a GPU 115 with a matching vGPU profile and a matching vGPU scheduling policy is found, the GPU 115 or its identifier can be returned. Otherwise, the virtual machine scheduler 120 can iteratively identify the next highest priority level vGPU scheduling policy and determine whether any candidate GPUs 115 match, and so on until the best-available matching vGPU scheduling policy is found according to the vGPU scheduling policy matching order.

The virtual machine scheduler 120 can also work in conjunction with the hypervisor 135 to assign and migrate the virtual machines 118 based on GPUs 115 of the hosts 113. The virtual machine scheduler 120 can identify GPU requirements for a virtual machine 118. The GPU requirements can include a GPU memory, a GPU type or model, and a GPU processing requirement. The virtual machine scheduler 120 can migrate a vGPU-enabled GPU 115 to execute the virtual machine 118 in consideration of the GPU requirements as well as virtual machine migration rules 129 and vGPU scheduling migration rules 130. Virtual machine migration rules 129 can include virtual machine migration thresholds for resource balancing, efficiency, and cost factors, as well as affinity rules such as affinities and anti-affinities with hosts 113, virtual machines 118, clusters 106, and other requirements.

GPU data 125 can represent information related to GPUs 115, as well as related hardware resources. GPU data 125 can include information such as the amount of GPU memory of the GPU 115, a set of supported vGPU profiles for the GPU 115, and a GPU configuration status. The GPU configuration status can indicate whether or not the GPU 115 is currently configured with a particular vGPU profile. If the GPU 115 is configured, the configuration status can also indicate the configured vGPU profile of the GPU 115. GPU data 125 can also include information related to the virtual machines 118 currently executing on each GPU 115, as well as virtual machines 118 scheduled or slated to be executed. GPU data 125 can include a record of the virtual machines 118 assigned to each GPU 115. GPU data 125 can also include vGPUs 151 of the GPUs 115. For each vGPU 151, the GPU data 125 can include a GPU memory reservation and availability status. The GPU memory reservation can be an amount of GPU memory of the vGPU 151, according to a configured vGPU profile of the associated GPU 115. GPU data 125 can also include a maximum number of virtual machines 118 that are supported by the GPU 115 when configured with a particular vGPU profile as discussed.

Virtual machine data 128 can represent information related to virtual machines 118. Virtual machine data 128 can include a record of all vGPU requests for the virtual machines 118. A vGPU request can include a graphics processing workload or graphics processing requirement of a virtual machine 118. Virtual machine data 128 can include an identifier or name of each virtual machine 118, and an identifier or location of a GPU 115 where a vGPU request or virtual machine 118 is being processed or executed.

The hypervisor 135, which may sometimes be referred to as a virtual machine monitor (VMM), can be an application or software stack that allows for creating and running virtual machines 118, and performing the virtual machines 118 using hardware resources of the computing environment 103. The virtual machine scheduler 120 can work in conjunction with the hypervisor 135 to execute the virtual machines 118 on hardware resources that include the GPUs 115. A vGPU manager component can be installed and executed in the hypervisor 135 layer and can virtualize the underlying physical GPUs 115 using vGPUs 151. For example, GPUs 115, including NVIDIA® Pascal and others, can offer virtualization for both graphics and GPGPU (CUDA) applications.

A hypervisor 135 can be configured to provide guest operating systems with a virtual operating platform, including virtualized hardware devices or resources, and to manage the execution of guest operating systems within a virtual machine execution space provided on the host machine by the hypervisor 135. In some instances, a hypervisor 135 can be a type 1 or bare metal hypervisor configured to run directly on a host machine in order to control and manage the hardware resources 153. In other instances, the hypervisor 135 can be a type 2 or hosted hypervisor implemented as an application executed by an operating system executed by a host machine. Examples of different types of hypervisors include ORACLE VM SERVER™ MICROSOFT HYPER-V®, VMWARE ESX™ and VMWARE ESXi™ VMWARE WORKSTATION™, VMWARE PLAYER™, and ORACLE VIRTUALBOX®.

Figure 2:
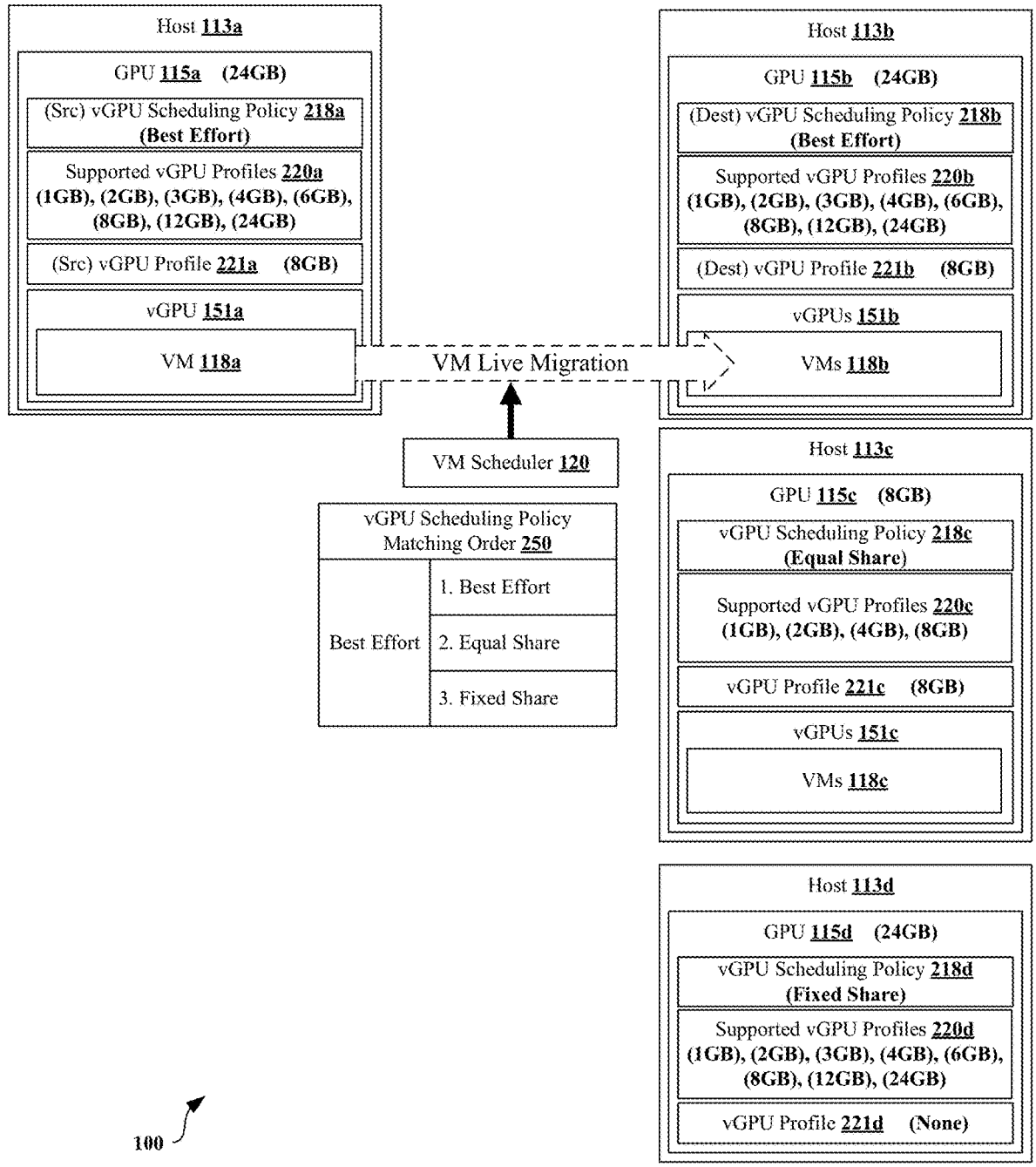
FIG. 2 is a drawing that illustrates an example of functionalities performed using components of the networked environment.

FIG. 2 illustrates an example of the operation of the components of the networked environment 100 of FIG. 1. Generally, the figure illustrates aspects of the vGPU scheduling-policy aware migration of a virtual machine 118a by the virtual machine scheduler 120.

The networked environment 100 can include hosts 113a, 113b, 113c, and 113d. The host 113a can have hardware including a GPU 115a. The GPU 115a can schedule its virtual machines, including the virtual machine 118a, using a vGPU scheduling policy 218a, which can be best effort for this example. The GPU 115a can include 24 GB of GPU memory, and can support even divisions of its GPU divisions according to the supported vGPU profiles 220a, including 1 GB, 2 GB, 3 GB, 4 GB, 6 GB, 8 GB, 12 GB, and 24 GB profiles. The vGPU profile 221a that is in use can be an 8 GB profile. The GPU 115a can maintain a vGPU 151a in conjunction with a hypervisor vGPU manager component. The GPU 115a can be assigned to execute the virtual machine 118a using the vGPU 151a.

The host 113b can have hardware including a GPU 115b. The GPU 115b can schedule its virtual machines 118b using a vGPU scheduling policy 218b, which can be best effort for this example. The GPU 115b can include 24 GB of GPU memory, and can support even divisions of its GPU divisions according to the supported vGPU profiles 220b, including 1 GB, 2 GB, 3 GB, 4 GB, 6 GB, 8 GB, 12 GB, and 24 GB profiles. The vGPU profile 221b that is in use can be an 8 GB profile. The GPU 115b can maintain a vGPU 151b in conjunction with a hypervisor vGPU manager component. The GPU 115b can be assigned to execute the virtual machines 118b using the vGPUs 151b.

The host 113c can have hardware including a GPU 115c. The GPU 115c can schedule its virtual machines 118c using a vGPU scheduling policy 218c, which can be equal share for this example. The GPU 115c can include 24 GB of GPU memory, and can support even divisions of its GPU divisions according to the supported vGPU profiles 220c, including 1 GB, 2 GB, 4 GB, and 8 GB profiles. The vGPU profile 221c that is in use can be an 8 GB profile. The GPU 115c can maintain a vGPU 151c in conjunction with a hypervisor vGPU manager component. The GPU 115c can be assigned to execute the virtual machines 118c using the vGPUs 151c.

The host 113d can have hardware including a GPU 115d. The GPU 115d can schedule virtual machines using a vGPU scheduling policy 218d, which can be fixed share for this example. The GPU 115d can include 8 GB of GPU memory, and can support even divisions of its GPU divisions according to the supported vGPU profiles 220d, including 1 GB, 2 GB, 3 GB, 4 GB, 6 GB, 8 GB, 12 GB, and 24 GB profiles. The vGPU profile 221d can be currently unassigned, or no profile. As a result, for profile matching purposes, the virtual machine scheduler 120 can consider the GPU 115d to match profiles based on any of its supported vGPU profiles 220d.

The virtual machine scheduler 120 can determine the optimal destination for the virtual machine 118a, among the GPUs 115b-115d. The virtual machine scheduler 120 can identify the GPU 115a assigned to execute the virtual machine 118a. The GPU 115a can use the 8 GB vGPU profile 221a, which can be considered a source vGPU profile for the virtual machine 118a. The GPU 115a can use the best effort vGPU scheduling policy 218a, which can be a source vGPU scheduling policy for the virtual machine 118a.

The virtual machine scheduler 120 can identify a list of candidate GPUs 115 with a vGPU profile that matches the source vGPU profile of 8 GB. The GPUs 115b and 115c have 8 GB vGPU profiles 221b and 221c that match the 8 GB source vGPU profile 221a. The GPU 115d has no profile currently configured, and it can support the 8 GB source vGPU profile or the GPU memory requirement of the virtual machine 118. As a result, the GPU 115d can be considered a match for the 8 GB source vGPU profile 221a. The virtual machine scheduler 120 can configure the vGPU profile 221d to be 8 GB or the memory requirement of the VM 118 during migration if selected as a destination. As a result, the list of candidate GPUs 115 can include the GPUs 115b, 115c, and 115d.

The virtual machine scheduler 120 can identify a vGPU scheduling policy matching order 250 based on the source vGPU scheduling policy 218a, which is best effort in this case. The virtual machine scheduler 120 can query the vGPU scheduling migration rules 130 using the best effort vGPU scheduling policy to identify a vGPU scheduling policy matching order 250. For best effort, the vGPU scheduling policy matching order 250 can list best effort, equal share, and fixed share in order of decreasing priority. The virtual machine scheduler 120 can iteratively examine the list of candidate GPUs 115 to identify a vGPU scheduling policy that has a best-available vGPU scheduling policy according to the vGPU scheduling policy matching order 250. The virtual machine scheduler 120 can first check whether any of the GPUs 115 have the best effort vGPU scheduling policy, since it is listed in the highest priority level of the vGPU scheduling policy matching order 250.

The virtual machine scheduler 120 can determine that the GPU 115b is configured to use the best effort vGPU scheduling policy. The virtual machine scheduler 120 can determine that the number of currently executing virtual machines 118b (or vGPUs 151b) is less than a maximum number for the vGPU profile 221b. The virtual machine scheduler 120 can select the GPU 115b as the destination GPU. As a result, the virtual machine scheduler 120 is able to minimize scheduling differences that can change or decrease performance of the virtual machine 118a.

Figure 3:
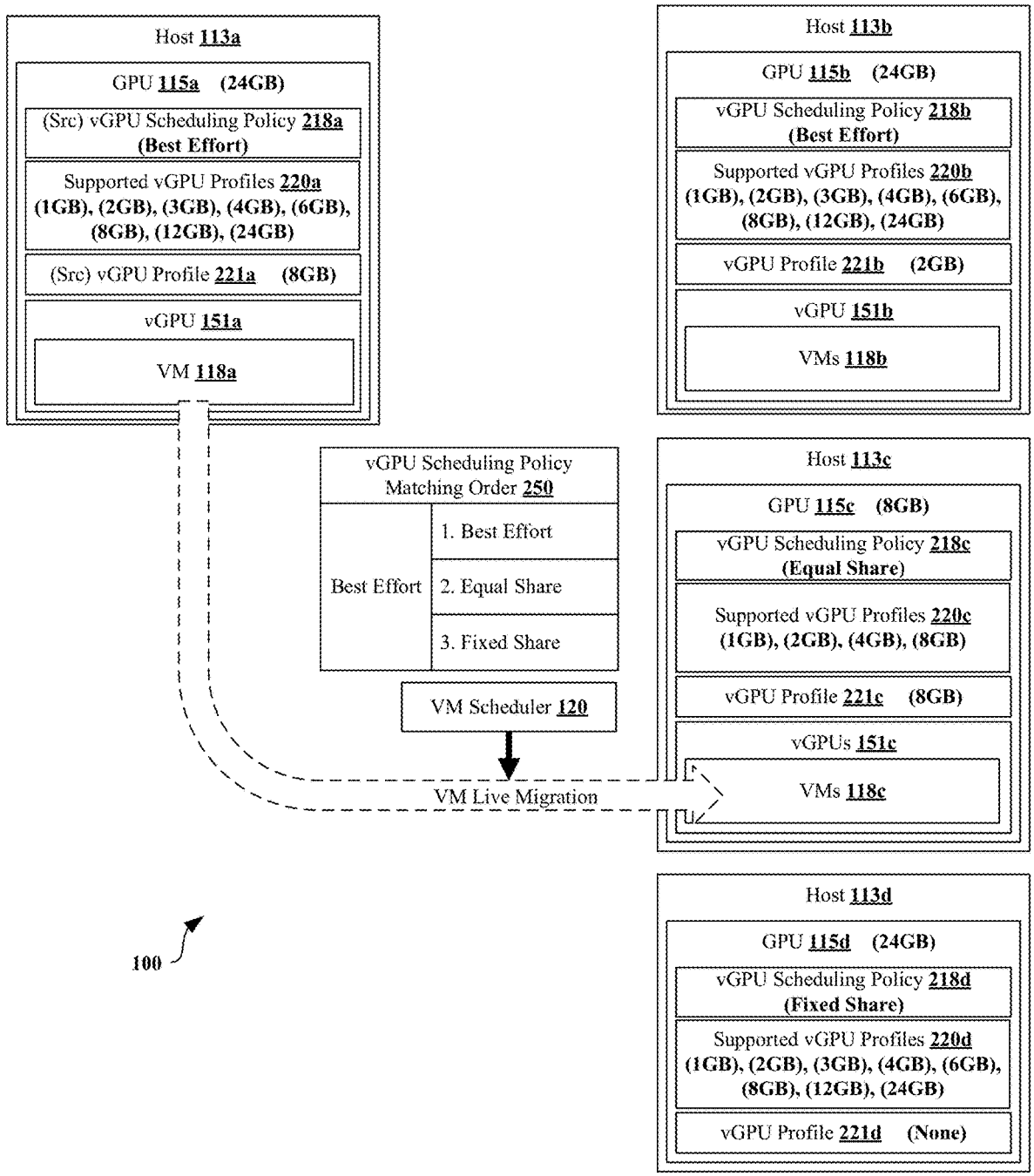
FIG. 3 is a drawing that illustrates another example of functionalities performed using components of the networked environment.

FIG. 3 illustrates another example of the operation of the components of the networked environment 100 of FIG. 1. Generally, the figure illustrates aspects of the vGPU scheduling-policy aware migration of a virtual machine 118a, by the virtual machine scheduler 120. The example of FIG. 3 differs from the example of FIG. 2 in that the vGPU profile 221b of the GPU 115b is a 2 GB profile.

The virtual machine scheduler 120 can determine the optimal destination for the virtual machine 118a, among the GPUs 115b-115d of the networked environment 100. The virtual machine scheduler 120 can identify the GPU 115a assigned to execute the virtual machine 118a. The GPU 115a can use the 8 GB vGPU profile 221a, which can be considered a source vGPU profile for the virtual machine 118a. The GPU 115a can use the best effort vGPU scheduling policy 218a, which can be a source vGPU scheduling policy for the virtual machine 118a.

The virtual machine scheduler 120 can identify a list of candidate GPUs 115 with a vGPU profile that matches the source vGPU profile of 8 GB. A vGPU profile that includes a GPU memory greater than or equal to the GPU memory of the source vGPU profile 221a can be counted as a match. Alternatively, the virtual machine scheduler 120 can identify a list of candidate GPUs 115 with a vGPU profile that is greater than or equal to a GPU memory requirement of the virtual machine 118a.

The list of candidate GPUs 115 includes the GPUs 115c and 115d. The GPU 115c has an 8 GB vGPU profile 221c that matches the 8 GB source vGPU profile 221a. The GPU 115d has no profile currently configured, and it can support the 8 GB source vGPU profile or the GPU memory requirement of the virtual machine 118. The GPU 115b is not included, because it is currently configured to a 2 GB vGPU profile 221b that differs from the vGPU profile 221a.

The virtual machine scheduler 120 can identify a vGPU scheduling policy matching order 250 based on the source vGPU scheduling policy 218a, which is best effort in this case. For best effort, the vGPU scheduling policy matching order 250 can list best effort, equal share, and fixed share in order of decreasing priority. The virtual machine scheduler 120 can iteratively examine the list of candidate GPUs 115 to identify a vGPU scheduling policy that has a best-available vGPU scheduling policy according to the vGPU scheduling policy matching order 250.

The virtual machine scheduler 120 can identify that none of the candidate GPUs 115 are configured to use best effort, which is the highest priority level vGPU scheduling policy. The virtual machine scheduler 120 can then move to the next priority level of the vGPU scheduling policy matching order 250, which indicates equal share. The virtual machine scheduler 120 can determine that the GPU 115c is configured to use the equal share vGPU scheduling policy. In other words, the best-available vGPU scheduling policy out of the list of candidate GPUs 115 is the equal share vGPU scheduling policy of the GPU 115c. The virtual machine scheduler 120 can determine that the number of currently executing virtual machines 118c (or vGPUs 151c) is less than a maximum number for the vGPU profile 221c. The virtual machine scheduler 120 can select the GPU 115c as the destination GPU.

Figure 4:
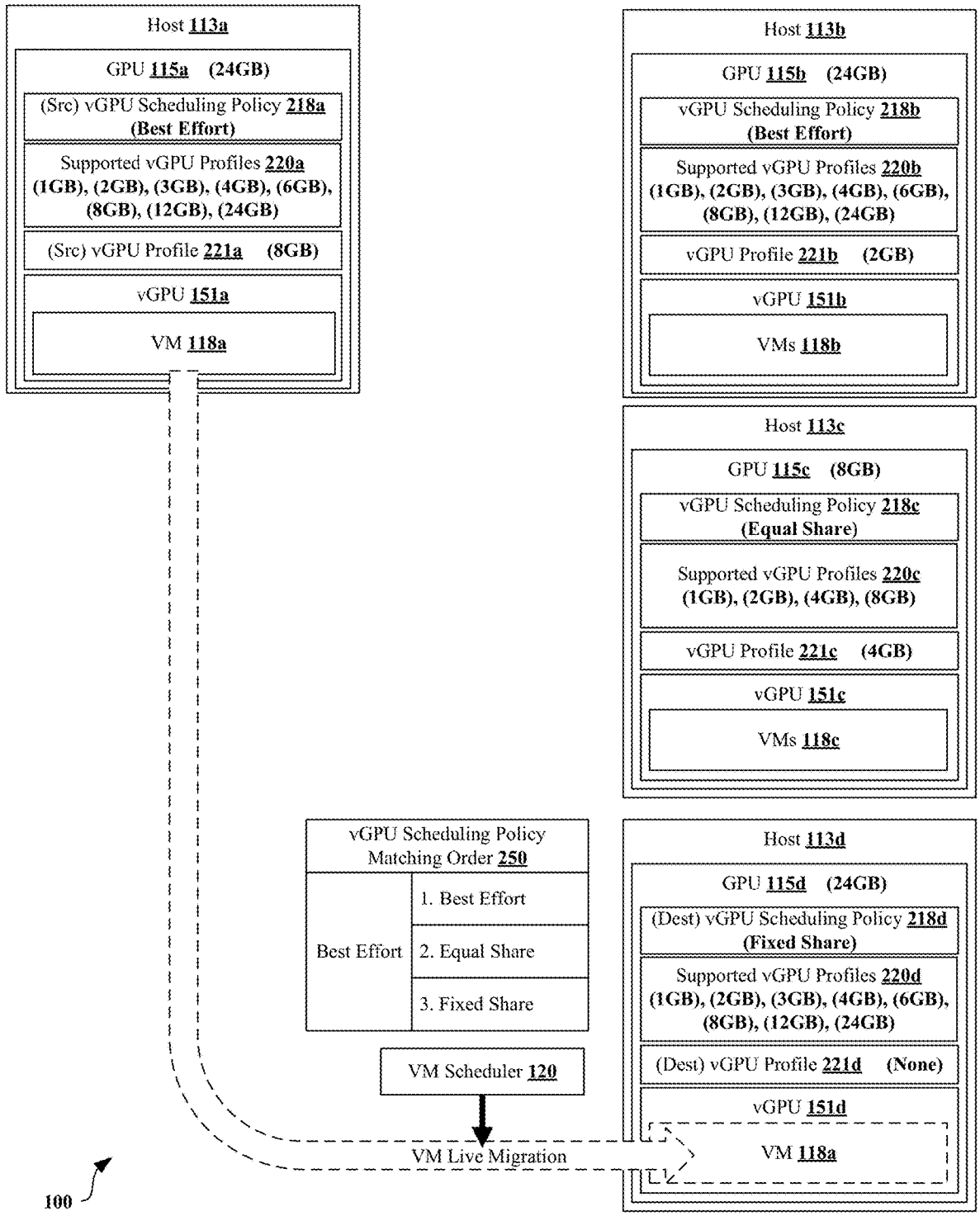
FIG. 4 is a drawing that illustrates another example of functionalities performed using components of the networked environment.

FIG. 4 illustrates another example of the operation of the components of the networked environment 100 of FIG. 1. Generally, the figure illustrates aspects of the vGPU scheduling-policy aware migration of a virtual machine 118a, by the virtual machine scheduler 120. The example of FIG. 4 differs from the example of FIG. 3 in that the vGPU profile 221c of the GPU 115c is a 4 GB profile.

The virtual machine scheduler 120 can determine the optimal destination for the virtual machine 118a, among the GPUs 115b-115d of the networked environment 100. The virtual machine scheduler 120 can identify the GPU 115a assigned to execute the virtual machine 118a. The GPU 115a can use the 8 GB vGPU profile 221a, which can be considered a source vGPU profile for the virtual machine 118a. The GPU 115a can use the best effort vGPU scheduling policy 218a, which can be a source vGPU scheduling policy for the virtual machine 118a.

The virtual machine scheduler 120 can identify a list of candidate GPUs 115 with a vGPU profile that matches the source vGPU profile of 8 GB. The list of candidate GPUs 115 includes the GPU 115d. The GPU 115d has no profile currently configured, and it can support the 8 GB source vGPU profile or the GPU memory requirement of the virtual machine 118. The GPU 115b is not included, because it is currently configured to a 2 GB vGPU profile 221b that differs from, and is less than, the vGPU profile 221a. The GPU 115c is not included, because it has a 4 GB vGPU profile 221c that differs from, and is less than, the vGPU profile 221a.

The virtual machine scheduler 120 can identify a vGPU scheduling policy matching order 250 based on the source vGPU scheduling policy 218a, which is best effort in this case. For best effort, the vGPU scheduling policy matching order 250 can list best effort, equal share, and fixed share in order of decreasing priority. The virtual machine scheduler 120 can iteratively examine the list of candidate GPUs 115 to identify a vGPU scheduling policy that has a best-available vGPU scheduling policy according to the vGPU scheduling policy matching order 250.

The virtual machine scheduler 120 can identify that none of the candidate GPUs 115 are configured to use best effort, which is the highest priority level vGPU scheduling policy. The virtual machine scheduler 120 can then move to the next priority level of the vGPU scheduling policy matching order 250, which indicates equal share. However, the virtual machine scheduler 120 can identify that none of the candidate GPUs 115 are configured to use equal share, and can move to the next priority level the vGPU scheduling policy matching order 250, which indicates fixed share.

The virtual machine scheduler 120 can determine that the GPU 115d is configured to use the fixed share vGPU scheduling policy. In other words, the best-available vGPU scheduling policy out of the list of candidate GPUs 115 is the fixed share vGPU scheduling policy of the GPU 115d. Although fixed share is in the lowest priority level of the vGPU scheduling policy matching order 250, it is the best-available vGPU scheduling policy from the list of candidate GPUs 115. The virtual machine scheduler 120 can determine that the number of currently executing virtual machines (or vGPUs 151) is zero, and less than a maximum number for the vGPU profile 221d. The virtual machine scheduler 120 can select the GPU 115d as the destination GPU.

Since the vGPU profile 221d is unconfigured, or there are no vGPUs with virtual machines assigned to the GPU 115d, the virtual machine scheduler 120 can configure the vGPU profile 221d to match the 8 GB source vGPU profile 221a. Alternatively, if the GPU memory requirement of the virtual machine 118a is less than the source vGPU profile 221a, then the virtual machine scheduler 120 can configure the vGPU profile 221d to be a lowest supported vGPU profile 220d that is adequate for the GPU memory requirement of the virtual machine 118a. For example, if the GPU memory requirement of the virtual machine 118a is 5 GB, the virtual machine scheduler 120 can configure the vGPU profile 221d to use a 6 GB supported vGPU profile 220d. The virtual machine 118a can be migrated to the GPU 115d.

FIG. 5 shows an example flowchart 500, describing steps that can be performed by instructions executed by the computing environment 103. Generally, the flowchart 500 describes how the virtual machine scheduler 120 can perform vGPU scheduling policy-aware migration of a virtual machine 118.

In step 503, the virtual machine scheduler 120 can identify virtual machine data 128 and GPU data 125. For example, the virtual machine scheduler 120 can monitor the computing environment 103 to detect or identify the virtual machine data 128 and GPU data 125. The various hosts 113 can include instructions to transmit or provide the virtual machine data 128 and GPU data 125 to the virtual machine scheduler 120 periodically, on a schedule, or in response to a request.

In step 506, the virtual machine scheduler 120 can identify hosts 113 that match virtual machine migration rules 129. The hosts 113 can be candidate hosts 113 for a migration of a virtual machine 118, which match load balancing, resource utilization, and other virtual machine migration rules 129 for the migration. The virtual machine scheduler 120 can identify a virtual machine 118 to migrate by a manual input or request to move a virtual machine 118 to a desired cluster 106, to a particular geographical location, or to a desired host 113. The virtual machine scheduler 120 can also identify a virtual machine 118 based on virtual machine migration rules 129, which can include rules to automatically migrate virtual machines 118 for load balancing or resource optimization purposes. The virtual machine scheduler 120 can refer to the virtual machine migration rules 129 to initiate migration of a virtual machine 118 to a host 113 with a lower resource utilization than its current or source host 113, in order to increase performance and reduce resource contention. In other situations, the virtual machine scheduler 120 can migrate a virtual machine 118 to a host 113 with a higher resource utilization in order to minimize a total number of hosts 113 used, which can decrease costs or energy usage.

In step 509, the virtual machine scheduler 120 can identify migration candidate GPUs 115 based on a source vGPU profile for the virtual machine 118. The virtual machine scheduler 120 can identify a vGPU profile currently used for the GPU 115 that is executing the virtual machine 118. This vGPU profile is the source vGPU profile for the virtual machine 118.

The virtual machine scheduler 120 can identify a list of candidate GPUs 115 with a vGPU profile that matches the source vGPU profile. Since the source vGPU profile defines the GPU memory currently available to the virtual machine 118, this ensures that the virtual machine 118 can be executed on the destination GPU 115 and host 113 that are ultimately selected for migration.

The virtual machine scheduler 120 can determine that a GPU 115 matches the source vGPU profile if the current vGPU profile of the GPU 115 has the same amount of GPU memory as the source vGPU profile of the virtual machine 118. The virtual machine scheduler 120 can also determine that a GPU 115 matches the source vGPU profile if the GPU 115 has no current profile, and the GPU 115 can support the source vGPU profile of the virtual machine 118.

In step 512, the virtual machine scheduler 120 can identify a vGPU scheduling policy matching order based on a source vGPU scheduling policy for the virtual machine 118. The virtual machine scheduler 120 can identify a vGPU scheduling policy currently used for the GPU 115 that is executing the virtual machine 118. This can be considered the source vGPU scheduling policy for the virtual machine 118.

The virtual machine scheduler 120 can use the source vGPU scheduling policy for the virtual machine 118 as a basis to search the vGPU scheduling migration rules 130 for a predetermined vGPU scheduling policy matching order for that vGPU scheduling policy or scheduling type. In other words, the source vGPU scheduling policy can be provided as a key or parameter to identify the vGPU scheduling policy matching order that is specific to that type of vGPU scheduling policy. A vGPU scheduling policy matching order can indicate a prioritized list of scheduling policies that the virtual machine scheduler 120 can use to optimize the selection of a destination GPU 115.

For example, if the source vGPU scheduling policy is equal share, the virtual machine scheduler 120 can identify a vGPU scheduling policy matching order that lists equal share, best effort, and fixed share in order of decreasing priority. If the source vGPU scheduling policy is fixed share, the virtual machine scheduler 120 can identify a vGPU scheduling policy matching order that lists fixed share, equal share, and best effort in order of decreasing priority. If the source vGPU scheduling policy is best effort, the virtual machine scheduler 120 can identify a vGPU scheduling policy matching order that lists best effort, equal share, and fixed share in order of decreasing priority.

In step 515, the virtual machine scheduler 120 can determine whether any GPUs in the list of candidate GPUs 115 are identified according to the current priority level of the vGPU scheduling policy matching order. The vGPU scheduling policy matching order can include prioritized list of scheduling policies. The virtual machine scheduler 120 can identify a vGPU scheduling policy listed at the current priority level. The virtual machine scheduler 120 can determine whether the list of candidate GPUs 115 includes a GPU 115 that has the same vGPU scheduling policy as the vGPU scheduling policy listed at the current priority level. If no GPUs 115 match, the process can move to step 518. If a GPU 115 matches the vGPU scheduling policy listed at the current priority level, then the process can move to step 521.

In step 518, if there are lower ranks in the prioritized list of scheduling policies, then the virtual machine scheduler 120 can consider the next-lower rank or priority level of the vGPU scheduling policy matching order in step 515. However, if there are no lower ranks, the virtual machine 118 is not migrated, and the virtual machine scheduler 120 can move to step 503.

The virtual machine scheduler 120 can perform an iterative or level by level process based on the prioritized list of scheduling policies or vGPU scheduling policy matching order. In a first iteration, the virtual machine scheduler 120 can consider the highest tier in the prioritized list of scheduling policies of the vGPU scheduling policy matching order. The next iteration can consider the next tier, and so on. Through this process, the virtual machine scheduler 120 can select a destination GPU 115 that has a best available one of the at least one vGPU scheduling policy according to the scheduling policy matching order.

In step 521, virtual machine scheduler 120 can determine whether the number of currently executing virtual machines 118 (or vGPUs 151) is less than a maximum number for the vGPU profile of the GPU 115. The virtual machine scheduler 120 can determine or identify a maximum number of vGPUs 151 for the GPU 115, based on its total memory and its vGPU profile. The virtual machine scheduler 120 can identify the number of currently executing virtual machines 118 or vGPUs 151 from the GPU data 125. The virtual machine scheduler 120 can compare the number of currently executing virtual machines 118 to the maximum. If the number of currently executing virtual machines 118 is greater than or equal to the maximum, then the virtual machine scheduler 120 can consider the next-lower rank or priority level of the vGPU scheduling policy matching order in step 515. If the number of currently executing virtual machines 118 is less than the maximum, then the virtual machine scheduler 120 can move to step 524.

In step 524, the virtual machine scheduler 120 can determine whether to configure the destination GPU 115. For example, if the destination GPU 115 matched the vGPU profile based on the vGPU profile being currently unconfigured, then then the destination GPU 115 should be configured in step 527. Otherwise, the if the destination GPU 115 is currently configured, then the virtual machine scheduler 120 can move to step 530.

In step 527, the virtual machine scheduler 120 can configure the destination GPU 115. For example, the virtual machine scheduler 120 can configure the destination GPU 115 to have the same vGPU profile as the source vGPU profile. Alternatively, the virtual machine scheduler 120 can configure the destination GPU 115 to a vGPU profile 220 that is adequate for the GPU memory requirement of the virtual machine 118.

In step 530, the virtual machine scheduler 120 can migrate the virtual machine 118 to the destination GPU 115. This can include creating a vGPU 151 for the virtual machine 118 in conjunction with a hypervisor 135, and assigning the virtual machine 118 to the vGPU 151. The virtual machine 118 can also be replicated or stored on hardware of the host 113 corresponding to the destination GPU 115.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drives, solid-state drives, USB flash drives, memory cards, optical discs such as compact discs (CDs) or digital versatile discs (DVDs), floppy discs, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowchart shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or in machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A system comprising:
   at least one computing device comprising at least one processor and at least one data store;
   machine readable instructions accessible to the at least one computing device, wherein the instructions, when executed by the at least one processor, cause the at least one computing device to at least:
   identify virtual graphics processing unit (vGPU) scheduling migration rules comprising at least one of:
      a best-effort matching order that indicates best-effort scheduling, equal-share scheduling, and fixed-share scheduling in decreasing order;
      an equal-share matching order that indicates equal-share scheduling, best-effort scheduling, and fixed-share scheduling in decreasing order; and
      a fixed-share matching order that indicates fixed-share scheduling, best-effort scheduling, and equal-share scheduling in decreasing order;
   identify at least one graphics processing unit (GPU) that is compatible with a current vGPU profile for a virtual machine, wherein the at least one GPU comprises a corresponding at least one vGPU scheduling policy;
   determine, based on a current vGPU scheduling policy for the virtual machine, an ordered list of scheduling policies corresponding to: the best-effort matching order, the equal-share matching order, or the fixed-share matching order;
   select a destination GPU from the at least one GPU based on a vGPU scheduling policy of the destination GPU being identified as a best available one of the corresponding at least one vGPU scheduling policy according to the ordered list of scheduling policies; and
   migrate the virtual machine to the destination GPU.

2. The system of claim 1, wherein the current vGPU scheduling policy is provided as a key to select the ordered list of scheduling policies.

3. The system of claim 1, wherein the corresponding at least one vGPU scheduling policy controls how time slices are allocated to vGPUs of the at least one GPU.

4. The system of claim 1, wherein the instructions, when executed by the at least one processor, cause the at least one computing device to at least:
   configure the destination GPU to a particular vGPU profile based on at least one of: the current vGPU profile, and a GPU memory requirement of the virtual machine.

5. The system of claim 1, wherein the vGPU scheduling policy corresponds to: best-effort scheduling, equal-share scheduling, or fixed-share scheduling.

6. The system of claim 1, wherein the instructions, when executed by the at least one processor, cause the at least one computing device to at least:
   identify at least one host that matches threshold migration requirements, wherein the at least one host comprises the at least one GPU.

7. The system of claim 1, wherein the instructions, when executed by the at least one processor, cause the at least one computing device to at least:
   determine that a number of virtual machines running on the destination GPU is less than a maximum number of virtual machines for the destination GPU.

8. A method performed by at least one computing device executing machine-readable instructions, the method comprising:
   Identifying virtual graphics processing unit (vGPU) scheduling migration rules comprising at least one of:
      a best-effort matching order that indicates best-effort scheduling, equal-share scheduling, and fixed-share scheduling in decreasing order;
      an equal-share matching order that indicates equal-share scheduling, best-effort scheduling, and fixed-share scheduling in decreasing order; and
      a fixed-share matching order that indicates fixed-share scheduling, best-effort scheduling, and equal-share scheduling in decreasing order;
   identifying at least one graphics processing unit (GPU) that is compatible with a current vGPU profile for a virtual machine, wherein the at least one GPU comprises a corresponding at least one vGPU scheduling policy;
   determining, based on a current vGPU scheduling policy for the virtual machine, an ordered list of scheduling policies corresponding to: the best-effort matching order, the equal-share matching order, or the fixed-share matching order;
   selecting a destination GPU from the at least one GPU based on a vGPU scheduling policy of the destination GPU being identified as a best available one of the corresponding at least one vGPU scheduling policy according to the ordered list of scheduling policies; and
   migrating the virtual machine to the destination GPU.

9. The method of claim 8, wherein the current vGPU scheduling policy is provided as a key to select the ordered list of scheduling policies.

10. The method of claim 8, wherein the corresponding at least one vGPU scheduling policy controls how time slices are allocated to vGPUs of the at least one GPU.

11. The method of claim 8, further comprising:
    configuring the destination GPU to a particular vGPU profile based on at least one of: the current vGPU profile, and a GPU memory requirement of the virtual machine.

12. The method of claim 8, wherein the vGPU scheduling policy corresponds to: best-effort scheduling, equal-share scheduling, or fixed-share scheduling.

13. The method of claim 8, further comprising:
identifying at least one host that matches threshold migration requirements, wherein the at least one host comprises the at least one GPU.

14. The method of claim 8, further comprising:
determining that a number of virtual machines running on the destination GPU is less than a maximum number of virtual machines for the destination GPU.

15. A non-transitory computer-readable medium comprising machine readable instructions, wherein the instructions, when executed by at least one processor, cause at least one computing device to at least:
identify virtual graphics processing unit (vGPU) scheduling migration rules comprising at least one of:
  a best-effort matching order that indicates best-effort scheduling, equal-share scheduling, and fixed-share scheduling in decreasing order;
  an equal-share matching order that indicates equal-share scheduling, best-effort scheduling, and fixed-share scheduling in decreasing order; and
  a fixed-share matching order that indicates fixed-share scheduling, best-effort scheduling, and equal-share scheduling in decreasing order;
identify at least one graphics processing unit (GPU) that is compatible with a current vGPU profile for a virtual machine, wherein the at least one GPU comprises a corresponding at least one vGPU scheduling policy;
determine, based on a current vGPU scheduling policy for the virtual machine, an ordered list of scheduling policies corresponding to: the best-effort matching order, the equal-share matching order, or the fixed-share matching order;
select a destination GPU from the at least one GPU based on a vGPU scheduling policy of the destination GPU being identified as a best available one of the corresponding at least one vGPU scheduling policy according to the ordered list of scheduling policies; and
migrate the virtual machine to the destination GPU.

16. The non-transitory computer-readable medium of claim 15, wherein the current vGPU scheduling policy is provided as a key to select the ordered list of scheduling policies.

17. The non-transitory computer-readable medium of claim 15, wherein the corresponding at least one vGPU scheduling policy controls how time slices are allocated to vGPUs of the at least one GPU.

18. The non-transitory computer-readable medium of claim 15, wherein the instructions, when executed by the at least one processor, cause the at least one computing device to at least:
configure the destination GPU to a particular vGPU profile based on at least one of: the current vGPU profile, and a GPU memory requirement of the virtual machine.

19. The non-transitory computer-readable medium of claim 15, wherein the vGPU scheduling policy corresponds to: best-effort scheduling, equal-share scheduling, or fixed-share scheduling.

20. The non-transitory computer-readable medium of claim 15, wherein the instructions, when executed by the at least one processor, cause the at least one computing device to at least:
identify at least one host that matches threshold migration requirements, wherein the at least one host comprises the at least one GPU.

* * * * *